United States Patent [19]
Kelch et al.

[11] Patent Number: 5,201,530
[45] Date of Patent: Apr. 13, 1993

[54] MULTI-LAYERED BRUSH SEAL

[75] Inventors: George W. Kelch, Palm Beach Gardens; John L. Shade, Jupiter, both of Fla.

[73] Assignee: United Technologies Corporation, Hartford, Conn.

[21] Appl. No.: 778,554

[22] Filed: Oct. 18, 1991

[51] Int. Cl.$^5$ ............................................. F16J 15/447
[52] U.S. Cl. ........................................ 277/53; 277/55
[58] Field of Search ..................... 277/53, 152, 55–57

[56] References Cited

U.S. PATENT DOCUMENTS

| | | | |
|---|---|---|---|
| 5,031,922 | 7/1991 | Heydrich | 277/53 |
| 5,090,710 | 2/1992 | Flower | 277/53 |
| 5,106,104 | 4/1992 | Atkinson et al. | 277/1 |

FOREIGN PATENT DOCUMENTS

| | | | |
|---|---|---|---|
| 1952984 | 4/1970 | Fed. Rep. of Germany | 277/53 |
| 3431990 | 3/1986 | Fed. Rep. of Germany | 277/152 |
| 492954 | 9/1938 | United Kingdom | 277/152 |

*Primary Examiner*—William A. Cuchlinski, Jr.
*Assistant Examiner*—James K. Folker
*Attorney, Agent, or Firm*—Christopher T. Hayes

[57] ABSTRACT

The present invention is a brush seal for use between two components which move relative to each other. The brush seal has multiple layers of bristles, and the bristles within a particular layer have the same cross-sectional area or "thickness". The layers are arranged in the order of increasing thickness, with the bristles of the layer that forms the high pressure face of the brush seal having the smallest cross-sectional area. The larger bristles support the smaller bristles, and a backing plate supports the larger bristles.

22 Claims, 6 Drawing Sheets

MULTI-LAYERED BRUSH SEAL

DESCRIPTION

1. Technical Field

This invention relates to pressure seals for use between two components which move relative to each other.

2. Background Art

Brush seals, attached to a first component, are typically used to prevent the flow of a fluid from a high pressure region to a low pressure region along a second component which moves relative to the first component. Current brush seal technology typically utilizes a plurality of constant diameter wire fiber bristles and a backing plate which supports those bristles along most of the length thereof. The backing plate is required to prevent excessive deflection of the bristles and the excessive leakage around the bristle tips which would result if the bristles were unsupported against the pressure load.

Certain applications for brush seals, such as gas turbine engines and exhaust nozzles, require the bristles to span relatively large gaps between the backing plate and the second component. Using the brush seals of the prior art to span such a distance typically results in excessive leakage due to excessive bristle deflection. Extending the backing plate into near proximity of the second component to reduce the gap and the unsupported length of the bristles may result in interference between the backing plate and the second component, binding and/or damaging the second component at certain engine operating conditions.

What is needed is a brush seal that provides effective sealing of such gaps while preventing damaging interference between the backing plate and the second component.

DISCLOSURE OF THE INVENTION

According to the present invention, the foregoing and other objects are attained by providing a brush seal having multiple layers of bristles and a backing plate. The individual bristles within a particular layer have the same cross-sectional area or "thickness", and the layers are arranged in the order of increasing bristle thickness. The bristles of the layer that forms the high pressure face of the brush seal have a relatively small cross-sectional area allowing them to be flexible and closely packed, thereby providing a low porosity barrier to the flow of fluid therethrough. The bristles of the layer forming the low pressure face of the brush seal are mounted next to the backing plate and have a substantially larger cross-sectional area, and are therefore significantly stiffer than the bristles of the high pressure face.

One end of each of the bristles is secured in fixed relation to the backing plate thereby allowing each of the bristles to flex along the length thereof while maintaining the relative position of each bristle with respect to the other bristles. The backing plate of the present invention provides support for the larger cross-sectional area bristles, which in turn support the smaller cross-sectional area bristles against the pressure load, thereby preventing excessive deflection thereof. The result is a brush seal that provides effective sealing over a broader range of pressure loads than the brush seals of the prior art.

The foregoing and other features and advantages of the present invention will become more apparent from the following description and accompanying drawings.

BEST MODE FOR CARRYING OUT THE INVENTION

Figure 1:
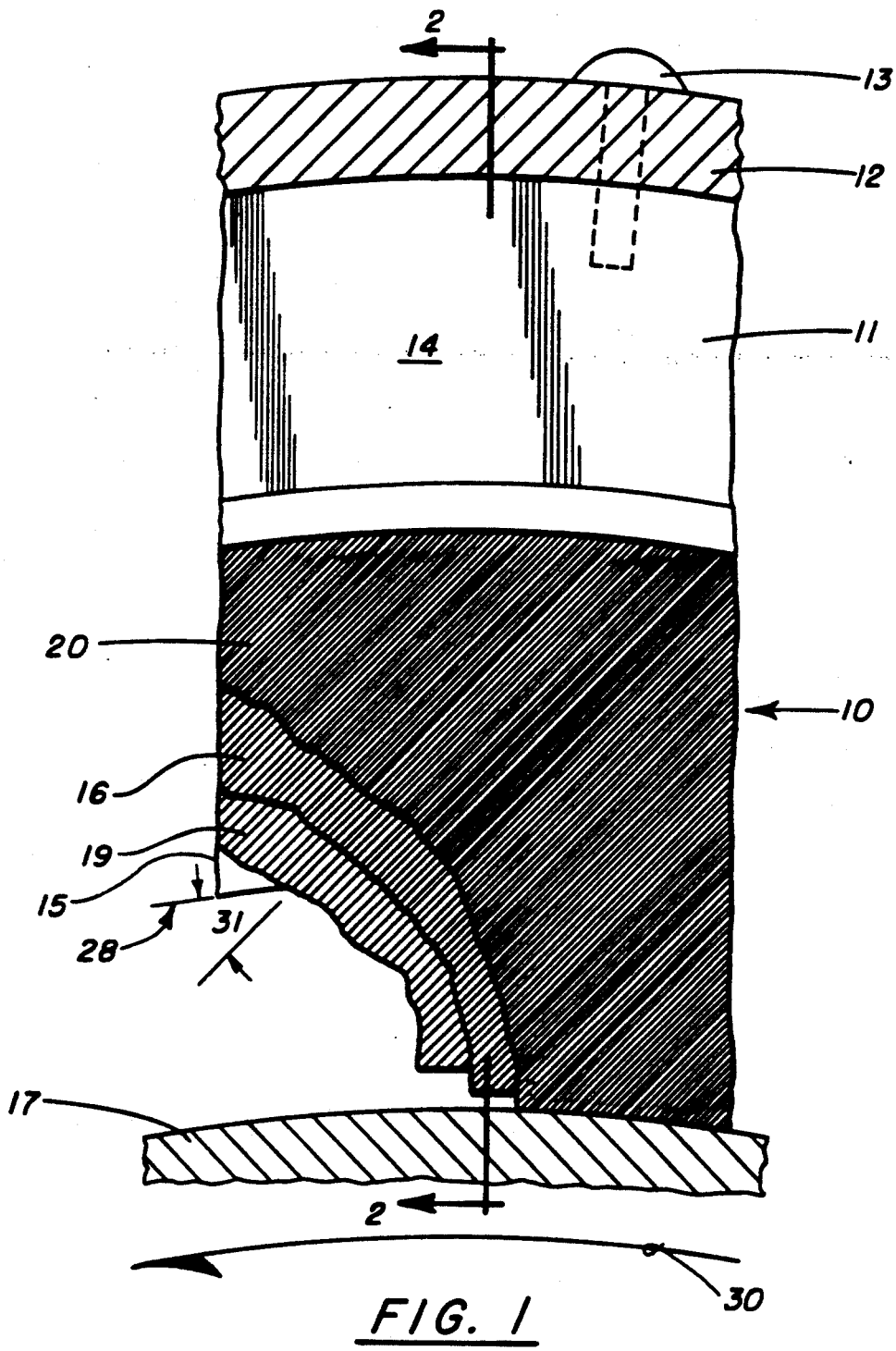
FIG. 1 is a partially cutaway view of the brush seal of the preferred embodiment of the present invention.
Figure 2:
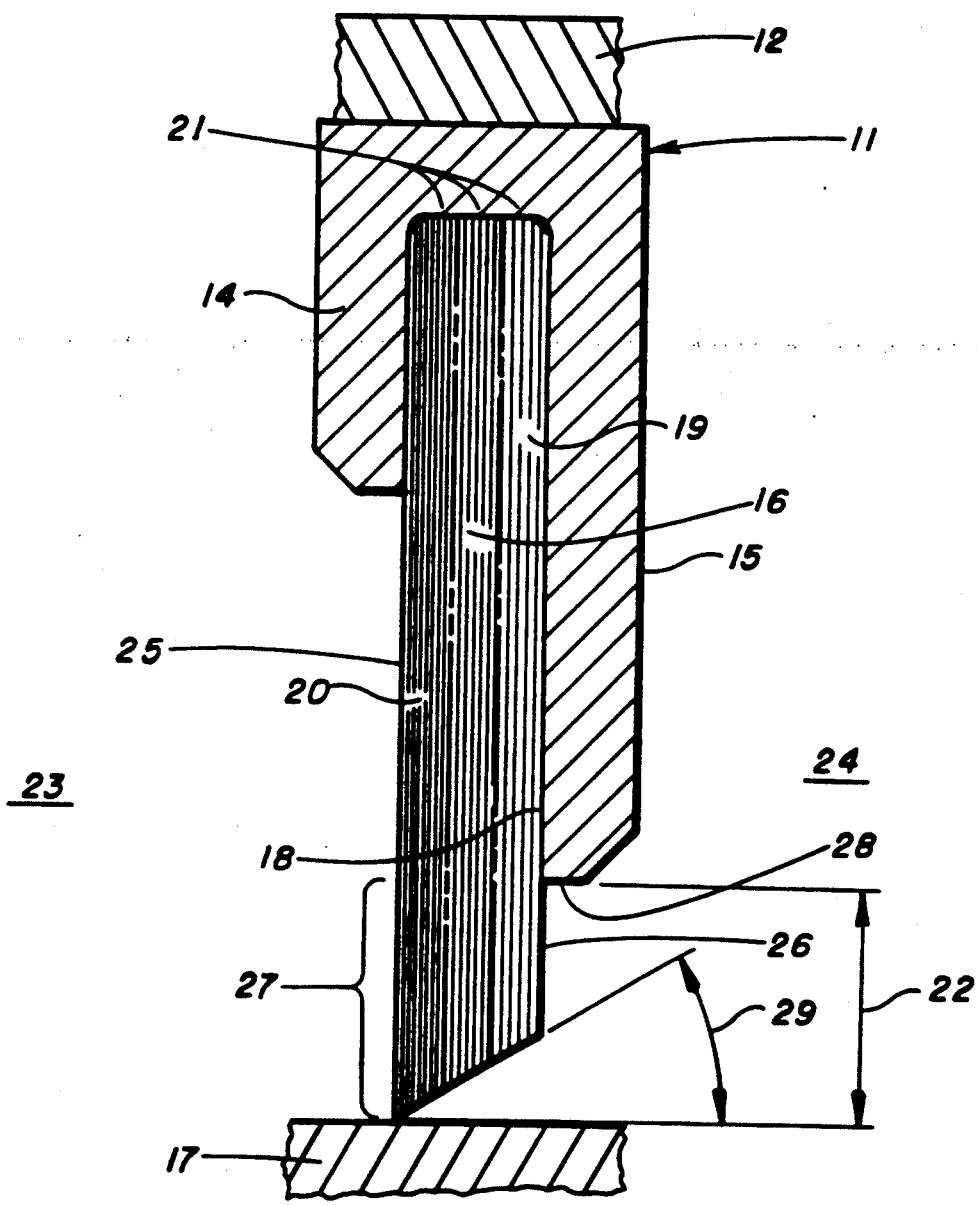
FIG. 2 is a cross-sectional view of the brush seal of the present invention taken along line 2—2 of FIG. 1.

As shown in FIG. 1, the brush seal 10 of the present invention includes a shell 11 secured to a first component 12 by a bolt 13 or other suitable fastening means (such as a flange, and/or snap diametrial fit). The shell 11 is preferably a channel having a head wall 14 and a backing plate 15. As shown in FIG. 2, the brush seal 10 has a layer of first bristles 16 extending toward a second component 17 which moves relative to the first component 12. The backing plate 15 has an inner surface 18 facing the head wall 14. A layer of second bristles 19 made of the same material as the first bristles 16 is sandwiched between the layer of first bristles 16 and the inner surface 18 of the backing plate 15. The cross-sectional area of each of the second bristles 19 is substantially larger than the cross-sectional area of the first bristles, and therefore, as those skilled in the art will readily appreciate, the second bristles 19 are substantially stiffer than the first bristles 16. In the preferred embodiment the first and second bristles 16, 19 are circular in cross-section with the diameter of each of the second bristles 19 being approximately twice the diameter of each of the first bristles 16.

In the preferred embodiment, a third layer of bristles 20 is included in the configuration. The third layer of bristles 20 is sandwiched between the head wall 14 and the layer of first bristles 16. Each of the third bristles 20 is made of the same material as the first bristles 16, but has a cross-sectional area substantially less, and preferably only about half, of the cross-sectional diameter of each of the first bristles 16. Preferably, the first, second and third bristles 16, 19, 20 are made of approximately 3 mil, 6 mil and 1.5 mil diameter wire, respectively, for the intended application, however, the specific diameter may change depending on the specific application. At one end 21, each of the first, second and third bristles 16, 19, 20 is secured in fixed relation to the shell 11 preferably by welding the bristle ends 21 thereto.

Each of the first, second and third bristles 16, 19, 20 extend into a gap 22 between the first component 12 and the second component 17, thereby defining the boundary between a high pressure region 23 and a low pressure region 24. The third bristles 20 in contact with the head wall 14 thus form a portion of the high pressure face 25 of the brush seal 10, and the second bristles 19 in contact with the inner surface 18 of the backing wall 15 form a portion of the low pressure face 26 of the brush seal 10. In the preferred embodiment, each of the layers of bristles 16, 19, 20 is parallel to the inner surface 18 of the backing plate 15, and each of the first, second and third bristles 16, 19, 20 is canted in the direction of rotation at an angle 31 of approximately 45° to a tangent of the back plate edge 28, as shown in FIG. 1.

Referring again to FIG. 2, the tip portion 27 of the first, second and third bristles 16, 19, 20 extends beyond the edge 28 of the backing plate 15, terminating in proximate the second component 17, thereby substantially preventing fluid in the high pressure region 23 from flowing to the low pressure region 24 between the tip portion 27 and the second component 17.

In operation, the first component 12 is attached to a static structure and the second component 17 may have dynamic movement relative to component 12, thereby causing the tip of the first, second and third bristles 16, 19, 20 to become the location of movement between the first component 12 and the second component 17. The interstices of the closely packed bristles on the high pressure face 25 of the brush seal 10 and between the third bristles 20 and the second component 17, provide very little flow area. The pressure differential between the high pressure region 23 and the low pressure region 24 tends to deflect the tip portion 27 of the third bristles 20 toward the first bristles 16, and under certain conditions the pressure differential between the high pressure region 23 and the low pressure region 24 may be so great that the stiffness of the tip portion 27 of the third bristles 20 alone may not be sufficient to prevent excessive deflection thereof.

Such excessive deflection is prevented by the first and second bristles 16, 19, which due to the greater stiffness provided by the larger cross-sectional area thereof, resist the maximum pressure differential occurring across brush seal 10. The first and second bristles 16, 19 are, in turn, supported by the backing plate 15. However, because the first and second bristles 16, 19 provide some of the support to the third bristles 20 which, in the brush seals of the prior art, would have been provided by the backing plate 15, a larger gap 22 can be provided between the second component 17 and the edge 28 of the backing plate 15 in the present invention.

In the preferred embodiment, the tip portion 27 tapers at an angle 29 toward the first edge 28 as shown in FIG. 2, so that the third bristles 20 are in contact with the second component 17 when the gap 22 is at a nominal operating condition and so that the first bristles 16 only contact the second component 17 when the gap 22 has been typically reduced. In those severe conditions where the gap 22 is reduced even further, the second bristles 19 may contact the second component 17 as well. However, because of the larger gap 22 provided by the present invention, no interference occurs between the backing plate 15 and the second component 17.

Figure 3:
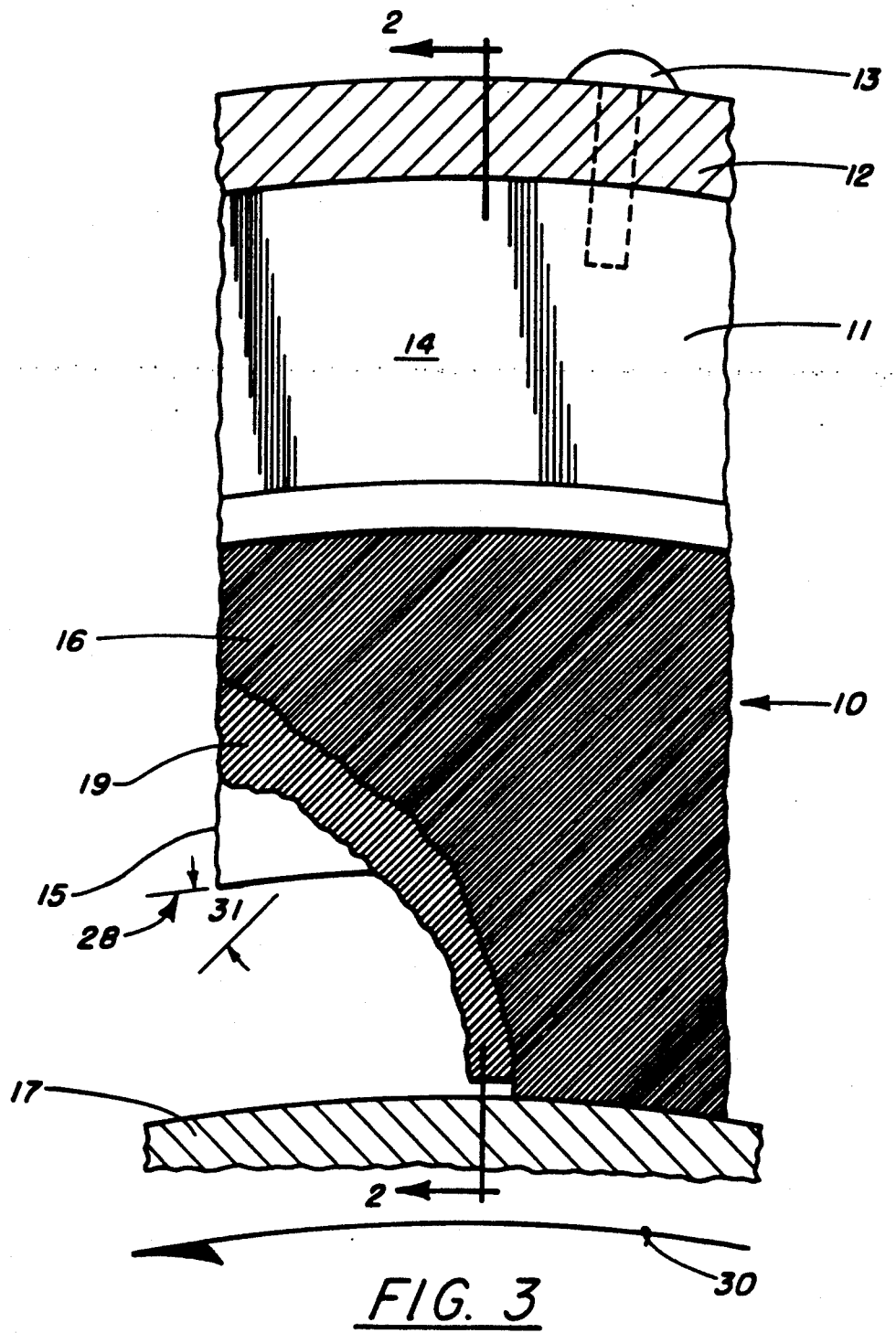
FIG. 3 is a partially cutaway view of a second embodiment of the brush seal of the present invention.

A second embodiment of the present invention is shown in FIG. 3 which is identical to the preferred embodiment except the third layer of bristles 20 has been excluded. Each of the first and second bristles 16, 19 extend into the gap 22 between the first component 12 and the second component 17, thereby defining the boundary between a high pressure region 23 and a low pressure region 24. In the second embodiment, each of the layers of bristles 16, 19 is parallel to the inner surface 18 of backing plate 15, and each of the first and second bristles 16, 19 is canted in the direction of rotation at an angle 31 of approximately 45° to a tangent of the back plate edge 28, as shown in FIG. 3.

In the second embodiment, the tip portion 27 tapers at an angle 29 toward the first edge 28 such that the first bristles 16 are in contact with the second component 17 when the gap 22 is at a nominal operating condition and/or the gap 22 has been typically reduced. In those severe conditions where the gap 22 is reduced even further, the second bristles 19 may also contact the second component 17 as well. However, because of the larger gap 22 provided by the present invention, no interference occurs between the backing plate 15 and the second component 17.

Figure 4:
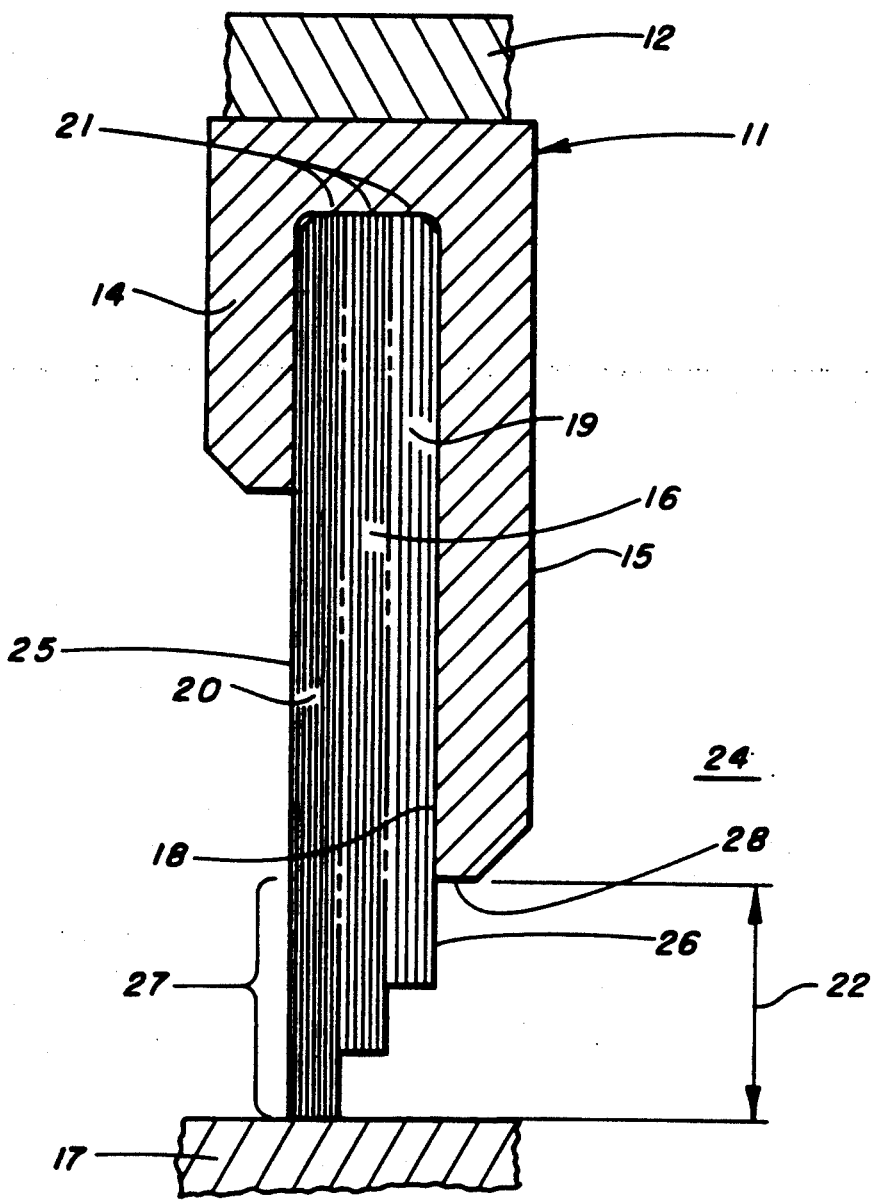
FIG. 4 is a cross-sectional view of a third embodiment of the brush seal of the present invention.

A third embodiment of the present invention is as shown in FIG. 4. The bristles are affixed and oriented in each of the three layers 16, 19, 20 as shown in FIG. 1 and described in the preferred embodiment, except that the tip portion 27 is stepped at each individual layer as shown in FIG. 4. In the third embodiment the third bristles 20 are cantilevered from the first bristles 16 and are in contact with the second component 17 when the gap 22 is at a nominal operation condition. The first bristles 16 are cantilevered from the second bristles 19 and contact the second component when the gap has been typically reduced. In those severe conditions where the gap 22 is reduced even further, the second bristles 19 may also contact the second component 17 as well. However, because of the large gap 22 provided by the present invention, no interference occurs between the backing plate 15 and the second component 17.

Similarly, a fourth embodiment of the present invention contains two layers of bristles 16, 19 which are stepped at the bristles tip 27 and has a configuration and function otherwise similar to the second embodiment.

Figure 5:
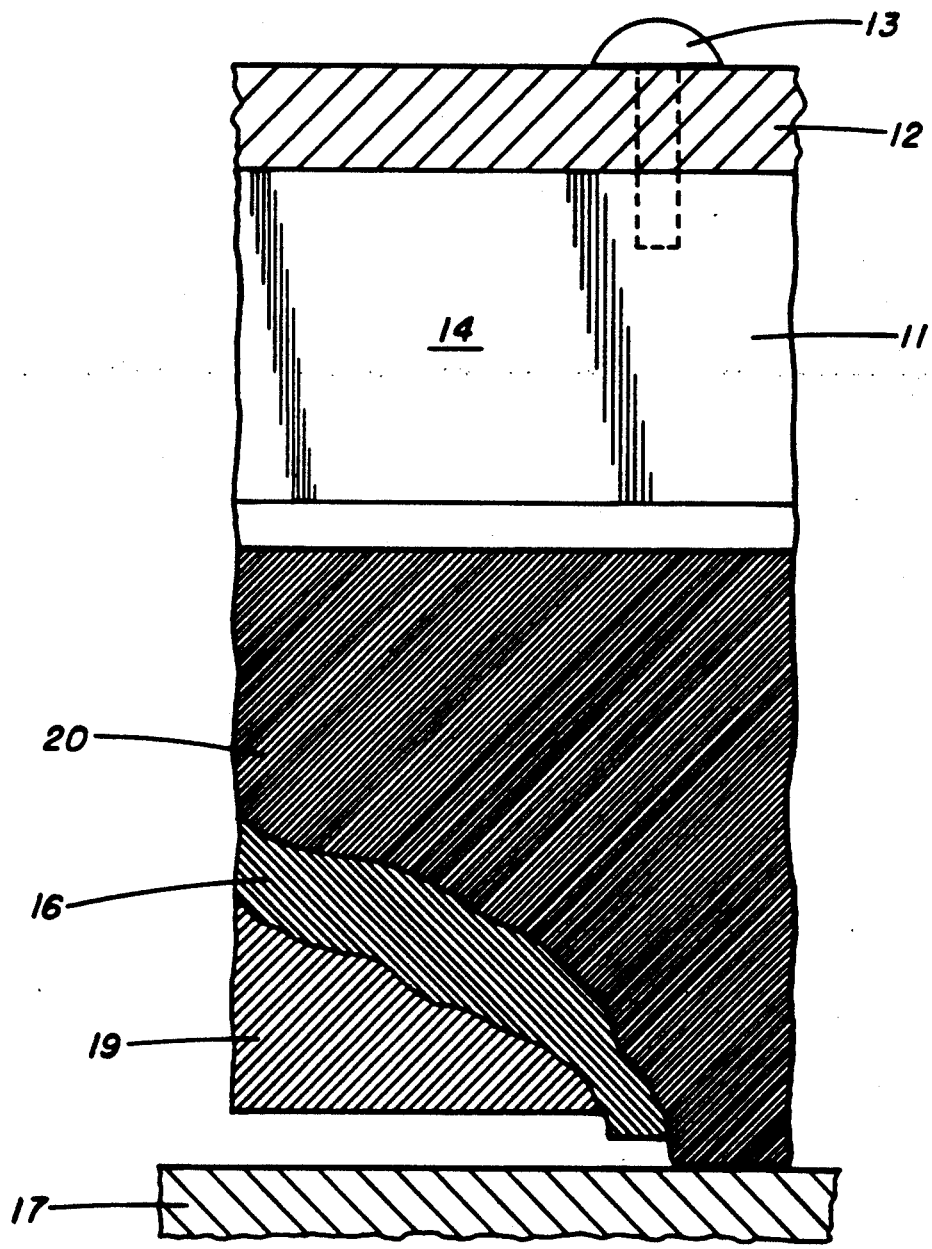
FIG. 5 is a partially cutaway view of a fifth embodiment of the brush seal of the present invention.
Figure 6:
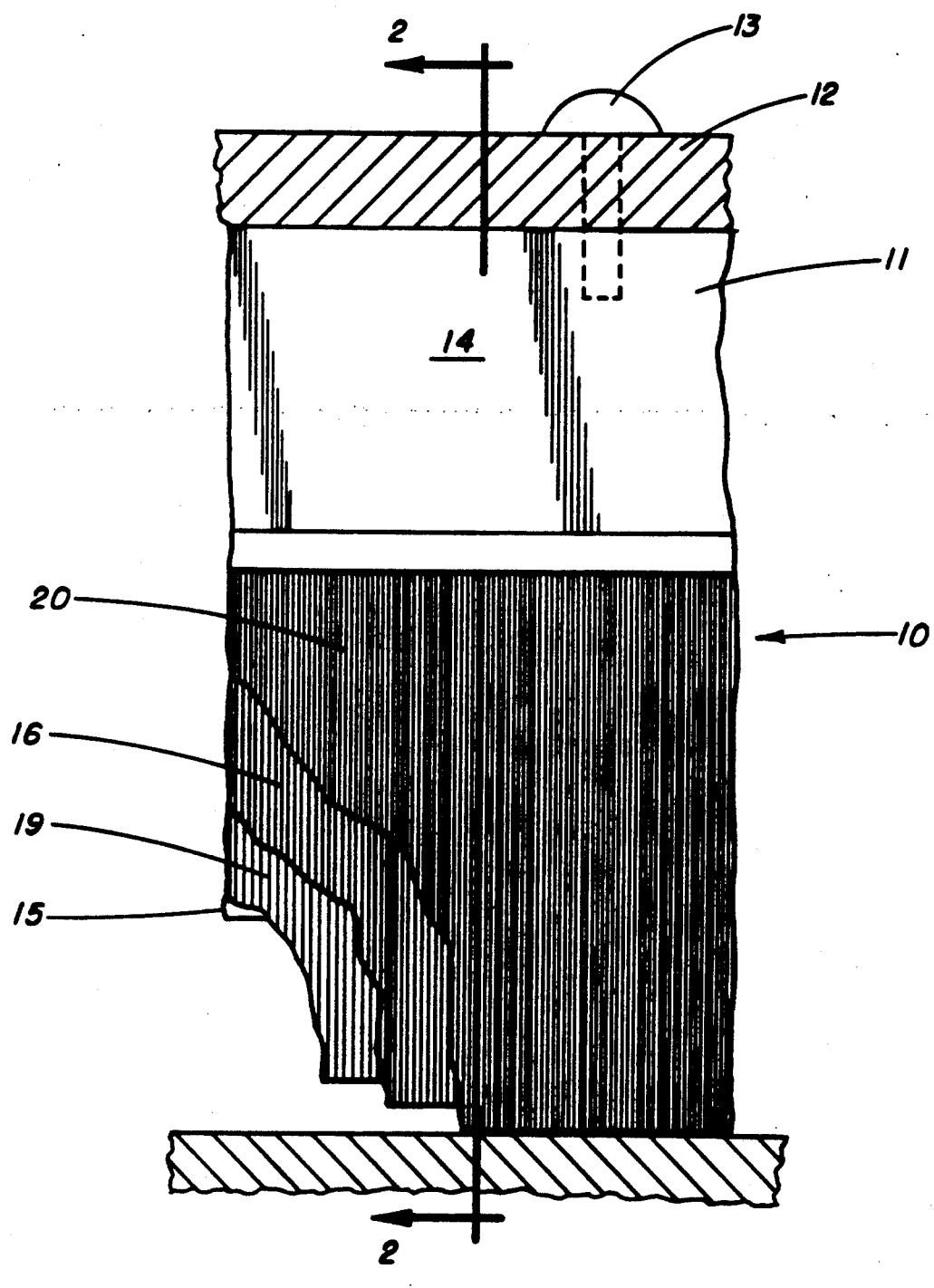
FIG. 6 is a partially cutaway view of a sixth embodiment of the brush seal of the present invention.

The first, second, third and fourth embodiments may be modified by orienting the first bristles 16 at an angle, preferably 90°, to the adjacent second bristles 19 and, if present, the third bristles 20, as shown in FIG. 5. Likewise, the first, second, third and fourth embodiments may be modified such that all of the bristles 16, 19, 20 are perpendicular to the tangent of the back plate edge 28, as shown in FIG. 6.

Although this invention has been shown and described with respect to a detailed embodiment thereof, it will be understood by those skilled in the art that various changes in form and detail thereof may be made without departing from the spirit and scope of the claimed invention.

We claim:

1. A brush seal comprising:
   a backing plate having a first surface terminating in a first edge;
   a first layer including a plurality of first bristles, each first bristle having a first cross-sectional area and aligned parallel to the first surface;
   a second layer including a plurality of second bristles sandwiched between and contacting the first layer of first bristles and the first surface, each second bristle having a second cross-sectional area greater than the first cross-sectional area and aligned parallel to the first surface;
   each of the first and second bristles having a tip portion which extends beyond the first edge and terminates in a second end; and,
   means for securing a first end of each of the first and second bristles in fixed relation to the backing plate.

2. The brush seal of claim 1 wherein the first bristles are aligned parallel to adjacent second bristles.

3. The brush seal of claim 1 wherein the first bristles are oriented at an angle to adjacent second bristles.

4. The brush seal of claim 2 wherein the second ends are tapered toward the first edge.

5. The brush seal of claim 3 wherein the second ends are tapered toward the first edge.

6. A brush seal comprising:
 a backing plate having a first surface terminating in a first edge;
 a first layer including a plurality of first bristles, each first bristle having a first cross-sectional area and aligned parallel to the first surface;
 a second layer including a plurality of second bristles sandwiched between and contacting the first layer of first bristles and the first surface, each second bristle having a second cross-sectional area greater than the first cross-sectional area and aligned parallel to the first surface;
 a third layer including a plurality of third bristles, each third bristle having a third cross-sectional area and aligned parallel to the first surface, said third cross-sectional area being less than said first cross-sectional area, said plurality of first bristles sandwiched between said plurality of second bristles and said plurality of third bristles; and,
 means for securing a first end of each of the first, second and third bristles in fixed relation to the backing plate;
 wherein each of the first, second and third bristles has a tip portion which extends beyond the first edge and terminates in a second end.

7. The brush seal of claim 6 wherein the first bristles are aligned parallel to adjacent second bristles.

8. The brush seal of claim 7 wherein the second ends are tapered toward the first edge.

9. The brush seal of claim 7 wherein each of the third bristles is longer than each of the first bristles, each of the first bristles is longer than each of the second bristles, all of the third bristles are of equal length, all of the first bristles are of equal length, and all of the second bristles are of equal length.

10. The brush seal of claim 6 wherein the first bristles are oriented at an angle to adjacent second bristles.

11. The brush seal of claim 10 wherein the second ends are tapered toward the first edge.

12. The brush seal of claim 10 wherein the third bristles are oriented at an angle to adjacent first bristles.

13. The brush seal of claim 12 wherein the second ends are tapered toward the first edge.

14. A brush seal for preventing the flow of a fluid from a high pressure region to a low pressure region, said brush seal comprising:
 a backing plate having a first surface terminating in a first edge, said backing plate mounted to a first component adjacent to a second component which moves relative to the first component;
 a first layer including a plurality of first bristles, each first bristle having a first cross-sectional area and aligned parallel to the first surface;
 a second layer including a plurality of second bristles sandwiched between and contacting the first layer of first bristles and the first surface, each second bristle having a second cross-sectional area greater than the first cross-sectional area and aligned parallel to the first surface; and
 means for securing a first end of each of the bristles in fixed relation to the backing plate;
 wherein each of the bristles has a tip portion which extends beyond the first edge and terminates in a second end, said tip portions defining a boundary between said high pressure region and said lower pressure region.

15. The brush seal of claim 14 wherein the first bristles are aligned parallel to adjacent second bristles.

16. The brush seal of claim 15 wherein the second ends are tapered toward the first edge.

17. The brush seal of claim 15 wherein each of the first bristles is longer than each of the second bristles, all of the first bristles are of equal length, and all of the second bristles are of equal length.

18. The brush seal of claim 14 wherein the first bristles are oriented at an angle to adjacent second bristles.

19. The brush seal of claim 18 wherein the second ends are tapered toward the first edge.

20. The brush seal of claim 18 further comprising a third layer including a plurality of third bristles, each third bristle having a third cross-sectional area and aligned parallel to the first surface, said third cross-sectional area being less than said first cross-sectional area said plurality of first bristles sandwiched between said plurality of second bristles and said plurality of third bristles, wherein each of the third bristles is oriented at an angle to adjacent first bristles.

21. The brush seal of claim 20 wherein the second ends are tapered toward the first edge.

22. The brush seal of claim 20 wherein each of the third bristles is longer than each of the first bristles, each of the first bristles is longer than each of the second bristles, all of the third bristles are of equal length, all of the first bristles are of equal length, and all of the second bristles are of equal length.

* * * * *